(12) United States Patent
Petit et al.

(10) Patent No.: US 7,100,450 B2
(45) Date of Patent: Sep. 5, 2006

(54) METHOD FOR CORRECTING PRESSURE MEASUREMENT FOR THE INFLUENCE OF TEMPERATURE IN A SAPPHIRE GAUGE

(75) Inventors: Pierre-Marie Petit, Saint Thibault des Vignes (FR); Stefan Moise, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 81 days.

(21) Appl. No.: 10/870,501

(22) Filed: Jun. 17, 2004

(65) Prior Publication Data
US 2005/0000290 A1    Jan. 6, 2005

(30) Foreign Application Priority Data
Jun. 19, 2003    (GB) ................ 0314240.3

(51) Int. Cl.
*G01L 7/00*    (2006.01)
(52) U.S. Cl. ................. 73/700; 364/571.03
(58) Field of Classification Search ........... 73/700, 73/708; 364/571.03
See application file for complete search history.

(56) References Cited
U.S. PATENT DOCUMENTS
5,329,818 A * 7/1994 Frick et al. ............ 73/708
5,394,345 A    2/1995 Berard et al.
2004/0144175 A1 * 7/2004 Sinha ..................... 73/579

* cited by examiner

*Primary Examiner*—Edward Lefkowitz
*Assistant Examiner*—Andre Allen
(74) *Attorney, Agent, or Firm*—Victor H. Segura; Brigitte L. Echols

(57) ABSTRACT

The invention concerns a method for correction with temperature in the pressure determination of a pressure gauge, comprising:
- measuring simultaneously with said gauge said pressure $P_m(t)$ and said temperature $T_m(t)$ during time,
- generating a signal $T_f(t)$ of said measured temperature $T_m(t)$, said measured temperature being filtered of the noise,
- (19) correcting said measured pressure $P_m(t)$ with a correction function $F(t)$ containing exclusively a dynamic part, said dynamic part containing a term $a_1$ proportional to first derivative of said $T_f(t)$ signal relative to time.

In another aspect of the invention the dynamic part further comprises a second additional term $a_2$ proportional to second derivative of said $T_f(t)$ signal relative to time.

8 Claims, 6 Drawing Sheets

METHOD FOR CORRECTING PRESSURE MEASUREMENT FOR THE INFLUENCE OF TEMPERATURE IN A SAPPHIRE GAUGE

FIELD OF THE INVENTION

The present invention relates to a method for measuring pressure in a well that has been drilled through geological formations, said method taking into account and correcting said pressure measurements from the variations due to both temperature and temperature gradients.

DESCRIPTION OF THE PRIOR ART

Proper management of a hydrocarbon reservoir requires the collection of pressure measurements at various depths in and around the reservoir. Pressure is measured repeatedly within the oil or gas-bearing formation to create a depth-based pressure profile. The change of pressure versus depth, also known as the slope of the pressure profile, provides a better understanding of the potential hydrocarbon content of the formation, and helps reservoir engineers to estimate the ability of oil or gas to flow from the reservoir to the surface.

Various pressure measurement systems are currently used down-hole and they are all characterized by the ability to be high-pressure and high-temperature proof. A system, also referred to as a pressure gauge, that measures down hole pressure has usually the following architecture: a pressure sensing element and a temperature sensing element, an acquisition block that samples the signal and converts it to digital data and a microprocessor that controls the acquisition block and sends the data to the surface.

As the environmental temperature conditions during measurement can vary on a very large scale, the components of the sensor and its packaging are submitted to important variations of their physical structure. Thermo-dynamic phenomena that can be considered negligible at room temperature become important when raising the temperature over a certain threshold.

For a pressure gauge, in order to cover the different behaviors on a large scale of temperatures, a temperature measurement of the pressure sensing-element is needed. For instance, the pressure signal at 1000 bar and 100° C. might be considerably different than the same pressure taken at 125° C. This is why the pressure signal has to be associated to the temperature signal in order to correctly retrieve the real pressure within the specified accuracy. Therefore the pressure measurement is expressed as a function of two variables: pressure signal and temperature signal.

An example of a pressure and temperature gauge has been described on the patent U.S. Pat. No. 5,024,098. This pressure and temperature gauge comprises:

- an equilibrated resistive bridge deposed on a sapphire membrane submitted to the pressure variations (the pressure sensing element); when the membrane bends due to applied pressure, the bridge gets off the equilibrium and a signal dependent on the pressure value is generated
- a thermo-resistive element placed on the membrane, close to the bridge, which measures the temperature very close to the pressure sensing element;
- a body assembly which includes a bellows used to communicate the outside pressure on the sensing element and to separate the contaminated fluid of the pressure line from the proper oil inside the gauge body;
- an associated electronics for signals acquisition.

Considering the non-linearity of the pressure and temperature signals with this kind of gauge, a calibration is needed to model the measurement. The calibration procedure comes to gather information on the gauge comportment at different pressure and temperature stages. A set of different pressure points that extends to all of the pressure range are acquired for a given temperature point; the procedure is repeated for a given number of different temperature points so that at the end a two-dimensional mesh of (pressure, temperature) points is acquired. An appropriate two-dimensional polynomial will interpolate the mesh given by the points acquired during calibration. This analytical function will be used during measurements to extract the real pressure from the pressure and temperature signals for any point found inside the gauge pressure and temperature ranges.

However, the above-described method of temperature correction of the pressure measurement has drawbacks: the calibration function is created from measurements acquired in static conditions, which means that the applied pressure and applied temperature are both constants (the calibration system waits for a certain non-variation of pressure and temperatures set). In real measurements the gauge is submitted to temperature gradients more or less important. That will induce an additional error on the pressure measurement mainly due to the temperature measurement time response (i.e. delay in reading the real temperature) and the changes of the pressure sensing-element, which are functions of temperature gradient. So real pressure will be: $P=P_m+F(T)$ where $P_m$ is the raw measured pressure and $F(T)$ the correction term, which is the combination of a static term $F_s(T)$ added to a dynamic term $F_d(T)$ as described above.

Patent U.S. Pat. No. 5,394,345 described a method for correcting measured pressure for the influence of temperature for a piezoelectric crystal gauge using both static and dynamic correction. The built models define expressions of the static and dynamic term of the compensation factor. The dynamic term relies on a correction of the pressure error induced by the temperature gradient using the temperature information. Basically the temperature gradient affects the physics of the pressure-sensing element and the pressure signal is therefore affected. By observing and quantitatively characterizing the influence of the temperature gradients on the pressure signal, it is possible to build compensation models which extract the temperature information, predict how that will affect the pressure signal and correct the potential error through the use of a compensation function. Nevertheless, as already discuss this method has the drawback to require a first calibration step dependent on intrinsic characteristic of every sensor and a second calculating step which leads to an extensive volume of resources and consequently limits drastically the possibility of using such algorithm in real time.

It is thus a goal of the invention to provide a method for dynamic compensation with temperature in the pressure determination of a pressure gauge that overcomes the drawbacks of the method known from the prior art. Particularly, it is an object of the invention to provide a method for correcting pressure measurement for the influence of temperature that does not need any temperature calibration and minimize the time response of the pressure gauge.

SUMMARY OF THE INVENTION

Therefore, it is provided a method for correction with temperature in the pressure determination of a pressure gauge, comprising:

measuring simultaneously with said gauge said pressure $P_m(t)$ and said temperature $T_m(t)$ during time, generating a signal $T_f(t)$ of said measured temperature $T_m(t)$, said measured temperature being filtered of the noise, correcting said measured pressure $P_m(t)$ with a correction function $F(t)$ containing exclusively a dynamic part, said dynamic part comprising a term a, proportional to first derivative of said $T_f(t)$ signal relative to time.

Preferably, said dynamic part further comprises a second additional term proportional to second derivative of said $T_f(t)$ signal relative to time: the correction function is therefore of the form:

$$F(t) = a_1 \cdot \frac{dT_f(t)}{dt} + a_2 \cdot \frac{d^2 T_f(t)}{dt^2},$$

wherein $a_1$ and $a_2$ are compensation coefficients respectively in $[MPa*second/degC]$ and in $[MPa*second^2/(degC)^2]$.

Preferably, the compensation coefficients are determined for a specific population of pressure gauge and are considered to be constant during measurements. This specific sensor population of 5 to 10 pressure gauges is representative to the all population of sensors, which belongs to the same technology and same line of manufacturing. These particular features enable to avoid any calibration step for the temperature measurements since it is not the temperatures themselves that are of importance for the compensation method but only the temperature gradients (the derivatives). Therefore, the temperature compensation method of the invention is easier to implement than compensation methods known in the art.

In one embodiment, the method of the invention comprises the step of:

determining said term $a_1$, measuring overtime pressure $P_m(t_i)$ and temperature $T_m(t)$ where $t_i$ is a sampling time with i integer between 1 and N.

generating a signal $T_f(t_i)$ of said measured temperature $T_m(t_i)$ through a low-pass filter, calculating the first derivative of said $T_f$ signal with the formula:

$$\left.\frac{dT_f(t)}{dt}\right|_{t_i} = \frac{T_f(t_{i+1}) - T_f(t_{i-1})}{t_{i+1} - t_{i-1}},$$

correcting said measured pressure $P_m(t_i)$ with the correction function $$F(t_i) = a_1 \cdot \left.\frac{dT_f(t)}{dt}\right|_{t_i}$$

This feature is of particular interest since it permits to reduce the amount of calculus resources that are needed to execute the correction method of the invention. Therefore it is one aim of the invention to be implemented in real-time and to permit direct acquisition of the pressures.

In another embodiment, the method of the invention comprises the step of:

determining said term $a_1$ and said term $a_2$, measuring overtime pressure $P_m(t_i)$ and temperature $T_m(t_i)$ where $t_i$ is a sampling time with i integer between 1 and N.

generating a signal $T_f(t_i)$ of said measured temperature $T_m(t_i)$ through a first low-pass filter, calculating the first derivative of said $T_f$ signal with the formula:

$$\left.\frac{dT_f(t)}{dt}\right|_{t_i} = \frac{T_f(t_{i+1}) - T_f(t_{i-1})}{t_{i+1} - t_{i-1}},$$

generating a signal $$\left.\frac{dT_f(t)}{dt}\right|_{t_i} \text{(filtered)}$$

of said first derivative $$\left.\frac{dT_f(t)}{dt}\right|_{t_i}$$

through a second low-pass filter, calculating the second derivative of said $T_f$ signal with the formula:

$$\left.\frac{d^2 T_f(t)}{dt^2}\right|_{t_i} = \frac{\left.\frac{dT_f(t)}{dt}\right|_{t_{i+1}} \text{(filtered)} - \left.\frac{dT_f(t)}{dt}\right|_{t_{i-1}} \text{(filtered)}}{2 \cdot t_i},$$

correcting said measured pressure $P_m(t_i)$ with the correction function $$F(t_i) = a_1 \cdot \left.\frac{dT_f(t)}{dt}\right|_{t_i} + a_2 \cdot \left.\frac{d^2 T_f(t)}{dt^2}\right|_{t_i}$$

This feature permits a real-time acquisition with a better accuracy, with correction at the second order. It is also able to adjust the parameters of the method (particularly the lengths n, m) each time new pressure and temperature measurements are acquired during a sampling time.

BRIEF DESCRIPTION OF THE DRAWINGS

Additional objects and advantages of the invention will become apparent to those skilled in the art upon reference to the detailed description taken in conjunction with the provided figures.

DETAILED DESCRIPTION

Figure 1A:
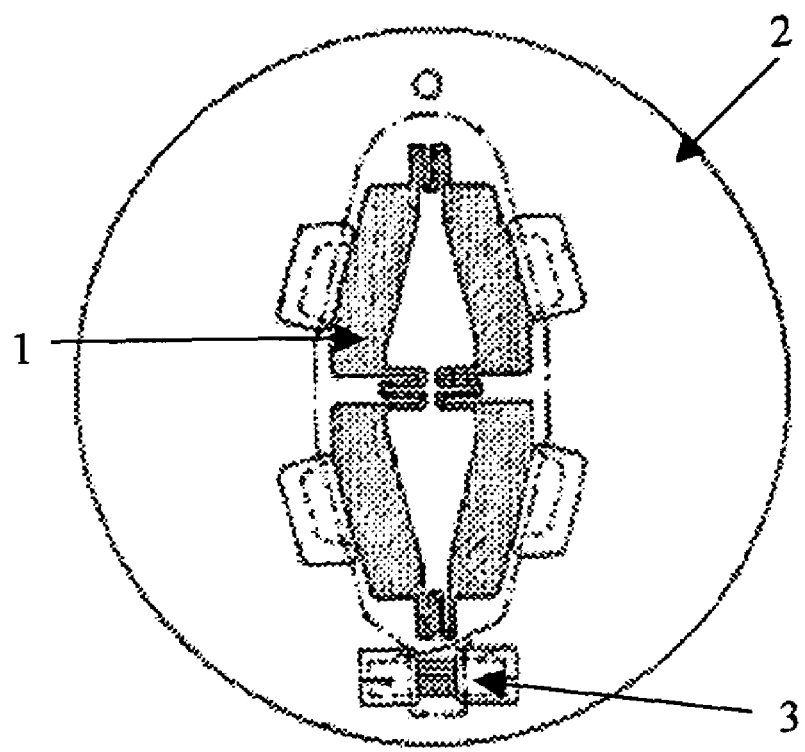
FIGS. 1a and 1b represent an example of a preferred pressure gauge used to perform the pressure measurements in the temperature compensated method of the invention.
Figure 1B:
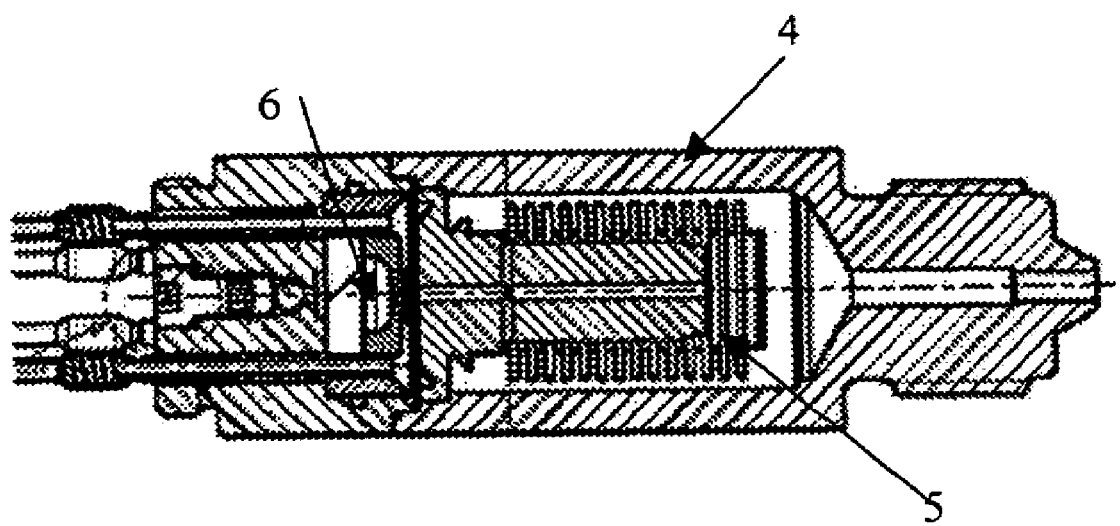

The term "gauge" is meant to include a complete assembly of a sensor as described in document U.S. Pat. No. 5,024,098. Therefore, as represented on the FIGS. 1a and 1b, the term "gauge" will include:

- an equilibrated Wheatstone resistive bridge 1 deposed on a sapphire membrane 2 submitted to the pressure variations (the pressure sensing element); when the membrane bends due to applied pressure, the bridge gets off the equilibrium and a signal dependent on the pressure value is generated;
- a thermo-resistive element 3 placed on the membrane, close to the bridge, which measures the temperature very close to the pressure sensing element; as an example, a fast responding thermal device such as a platinium resistance thermal device (RTD) might be used;
- a body assembly 4 which includes a bellows 5 used to communicate the outside pressure on the sensing element 6 and to separate the external environment which pressure is to be measured from the proper oil inside the sapphire body; and
- an associated electronics for signals acquisition and treatment.

The method of the invention is preferably performed with this sapphire gauge. However, it is also possible to process this method with any other gauge having the same technology.

Several test have been developed to characterize the effect of temperature gradients on the pressure gauge signal. A system of test consisting in a dead-weight-tester, an oil-bath regulated in temperature, a pump, several pressure gauges under test and an acquisition system for the pressure and temperature signals were used.

During the tests the pressure was kept constant through the use of the dead-weight tester. The temperature was stabilized at a given stage and then, at the reference time $t_o$, it was raised in order to create a big temperature gradient across the sensors. The system stabilized at the high temperature for a given interval of time and then a negative gradient of temperature was created, to get the system back to the original temperature.

Figure 2:
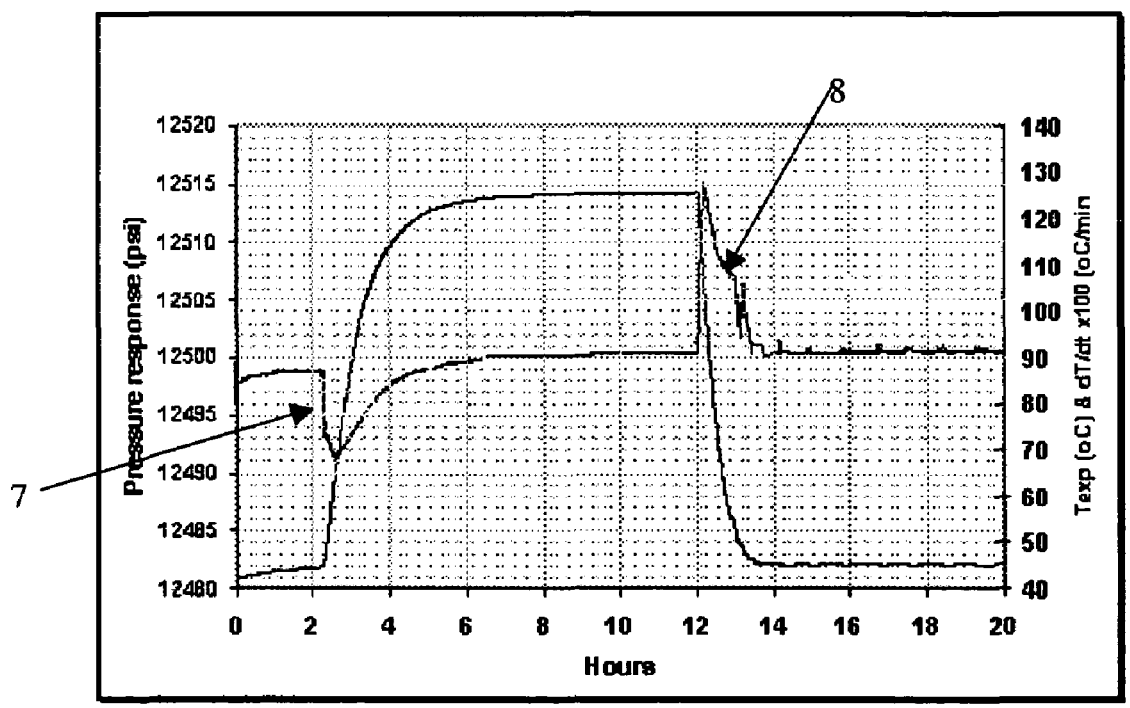
FIG. 2 shows the effect of the temperature gradient on the pressure measurement gauge.

During one of these tests, which results are represented on FIG. 2, temperature has been changed from 45° C. to 125° C. and then back to 45° C. under pressure conditions of 86.18 MPa (12.5 kpsi). As it can be seen on FIG. 2, a significant error on the pressure signal is committed every time the temperature changes. While the temperature increases at a high speed, the pressure curve has an undershot 7. This undershot is around 55.15 MPa (8 psi). When the temperature decreases at a high speed, an overshot 8 is detected on the pressure curve. The amplitudes of these errors are big if compared to the gauge accuracy but it has to be noted that these experimental conditions exceed with a large extend any real temperature gradient that may be encountered in an oil well. The goal on that was to increase the error-causing phenomenon amplitude in order to better observe and characterize the error. The bigger the temperature gradients exercised, the bigger the errors on the pressure curve; at stable temperature the error is zero. The same tests have been performed at different pressure stages (results not shown) and the observed errors followed the same shape and amplitude order, which proves that the phenomenon is not dependent on the pressure.

The method for dynamic compensation of the invention thus aims at reducing the amplitudes of both the undershot and the overshot observed. In the meantime, the method should correct the pressure measurement whatever the pressure is, i.e. the correction function has advantageously the same parameters for any range of pressures. Furthermore, in order to avoid the drawbacks related to absolute temperature measurement, it has been decided to use only the temperature gradient and gradient speed in the method of the invention. Therefore, be the measured pressure values $P_m(t_i)$, and the measured temperature values $T_m(t_i)$, where $t_i$ is the sampling time with i integer between 1 and N (N is the total number of measurements done), the objective of the thermal compensation method of the invention is to provide a function $F(t_i)$, which added to $P_m(t_i)$ will minimize the undershot and the overshot of the pressure curve. So corrected pressure will be: $P(t_i) = P_m(t_i) + F(t_i)$, with function $F(t_i)$ dependent of $T_m(t_i)$.

However, characterizing the effect of temperature gradients over the pressure-sensing element is often difficult, as a gradient must sometimes be amplified considerably to distinguish the effect on the pressure signal from the sensor noise. When the gradient is voluntarily amplified, other phenomena may be triggered that also contribute to the effect on the pressure signal. As a result, it is difficult to identify how much of the effect on the pressure signal is due to the amplified temperature gradient versus any other unpredicted phenomena. Furthermore, the temperature measurement in itself may be an issue. Actually, it is also essential when performing a temperature correction of the pressure measurement, that the noise on the temperature signal is small enough so that the correction function does not add a significant noise on the corrected pressure curve.

The method for dynamic compensation of the invention does not wait for thermal equilibrium between the sensor and the environment. Therefore the correction can be model by a function including only a dynamic term depending on the successive derivatives of the measured temperatures relative to time, for example at second order the correction will be of the form:

$$F_d(t) = a_1(T) \cdot \frac{dT(t)}{dt} + a_2(T) \cdot \frac{d^2T(t)}{dt^2}. \quad (1)$$

The coefficients $a_1(T)$ and $a_2(T)$ are compensation coefficients respectively measured in [Mpa*second/degC] and in [Mpa*second$^2$/(degC)$^2$]. These coefficients rigorously depend on the measured temperature and can be expressed adequately by a second degree polynomial. For each type or implementation of the pressure gauge, the coefficients of the polynomial need to be determined.

To simplify the model and use it in real-time, it is one aim of the invention to propose a correction where no calibration is needed before each measurement: coefficient $a_1$ and $a_2$ will be chosen constant and optimized for a population of sensor used. But, for this type of correction the major difficulty is to find a good compromise between the measurement noise and the calculation errors. More exactly, the calculation noise must be negligible, when compared to the acquisition channel noise of the sensor and the electronics. On the other hand, there is no need for highly complex correction algorithms generating very fine correction steps, because in this case the correction will be drowned in the measurement noise.

The correction function at the first order becomes:

$$F(t) = a_1 \cdot \frac{dT(t)}{dt}, \tag{2}$$

where $a_1$ is a constant coefficient; and at the second order becomes:

$$F(t) = a_1 \cdot \frac{dT(t)}{dt} + a_2 \cdot \frac{d^2 T(t)}{dt^2}, \tag{3}$$

where $a_1$ and $a_2$ are constant coefficients.

For the correction chosen, in order to respect the considerations above, we need:

to filter the measured temperature for using a temperature signal with a noise as low as possible;

to optimize the constant coefficient $a_1$ and $a_2$.

The correction function is constructed based on the first and second temperature derivatives, therefore very sensitive to temperature variations. In order to reduce this sensitivity, the correction function will be built starting from a filtered temperature signal. This simplification is possible because temperature variation is a phenomenon with a low dynamic. The highest frequencies found on the temperature signal are more related to the acquisition channel, and not specific to the real temperature dynamic. The filtered temperature will be therefore obtained from a low-pass filter, with cutoff frequency and order of the filter optimized for correction. This type of filter is especially useful since the random errors involved in the raw position data obtained through reconstruction are characterized by relatively high frequency contents. But, the main difficulty in filtering the temperature signal is to find a good compromise between noise reduction and the capability to preserve the information regarding quick temperature changes.

For use in real-time, the coefficients $a_1$ and $a_2$ may be retrieved statistically, based on observations over a specific sensor population, this specific sensor population of 5 to 10 pressure gauges being representative to the all population of sensors, which belongs to the same technology and same line of manufacturing. This optimization will be done to obtain the least error in a range of sensor population and therefore in a range of temperatures. These coefficients are calculated using the ratio between the temperature gradient amplitude, respectively the speed of the temperature gradient amplitude and the pressure error amplitude in order to correct the pressure error as much as possible. The optimal resulted values for $a_1$ and $a_2$ are used in the method for temperature compensation of the invention to correct the pressure measurement done by the gauge, when use in real-time of the measured pressure.

For use in post-processing of the measured pressure, other possibility to calculate the coefficients $a_1$ and $a_2$, is to minimize the error of approximation between $F(t)$ and $P_m(t)$, by the least square model. It means minimizing the function:

$$\sum_{i=1}^{N} [P_m(t_i) - F(t_i)]^2 \tag{4}$$

At second order, formula (3) is used for $F(t_1)$ in formula (4):

$$\sum_{i=1}^{N} \left[ P_m(t_i) - a_1 \cdot \frac{dT(t)}{dt}\bigg|_{t_i} - a_2 \cdot \frac{d^2 T(t)}{dt^2}\bigg|_{t_i} \right]^2 \tag{5}$$

With notation:

$$P_m(t_i) = A(i) \tag{6}$$

$$\frac{dT(t)}{dt}\bigg|_{t_i} = B(i) \tag{7}$$

$$\frac{d^2 T(t)}{dt^2}\bigg|_{t_i} = C(i) \tag{8}$$

Using (6), (7), (8), (5) becomes:

$$\sum_{i=1}^{N} [A(i) - a_1 \cdot B(i) - a_2 \cdot C(i)]^2 \tag{9}$$

First member of equation (9) is minimum if the first partial derivatives with $a_1$ and $a_2$ are null. The following system results:

$$\begin{cases} \dfrac{\partial \left( \sum_{i=1}^{N} [A(i) - a_1 \cdot B(i) - a_2 \cdot C(i)]^2 \right)}{\partial a_1} = 0 \\ \dfrac{\partial \left( \sum_{i=1}^{N} [A(i) - a_1 \cdot B(i) - a_2 \cdot C(i)]^2 \right)}{\partial a_2} = 0 \end{cases} \tag{10}$$

Solving this system the following values for $a_1$ and $a_2$ are obtained:

$$a_1 = \frac{\sum_{i=1}^{N} A(i) \cdot C(i) \cdot \sum_{i=1}^{N} B(i) \cdot C(i) - \sum_{i=1}^{N} A(i) \cdot B(i) \cdot \sum_{i=1}^{N} C(i)^2}{\left( \sum_{i=1}^{N} B(i) \cdot C(i) \right)^2 - \sum_{i=1}^{N} B(i)^2 \cdot \sum_{i=1}^{N} C(i)^2} \tag{11}$$

$$a_2 = \frac{\sum_{i=1}^{N} A(i) \cdot B(i) \cdot \sum_{i=1}^{N} B(i) \cdot C(i) - \sum_{i=1}^{N} A(i) \cdot C(i) \cdot \sum_{i=1}^{N} B(i)^2}{\left( \sum_{i=1}^{N} B(i) \cdot C(i) \right)^2 - \sum_{i=1}^{N} B(i)^2 \cdot \sum_{i=1}^{N} C(i)^2} \tag{12}$$

The optimal resulted values for $a_1$ and $a_2$ are used in the method for temperature compensation of the invention to correct the pressure measurement done by the gauge, when use in post-processing of the measured pressure. Because, the computation of the coefficients used also experimental data, $P_m(t_i)$, provided by the gauge itself; the values found are optimal only for the studied gauge.

When the coefficients $a_1$ and $a_2$ are obtained depending on which type of measurements are done, real-time or post-processing. The method for calculating correction function can be defined at first or second order as described in FIG. 3 and FIG. 4.

Figure 3:
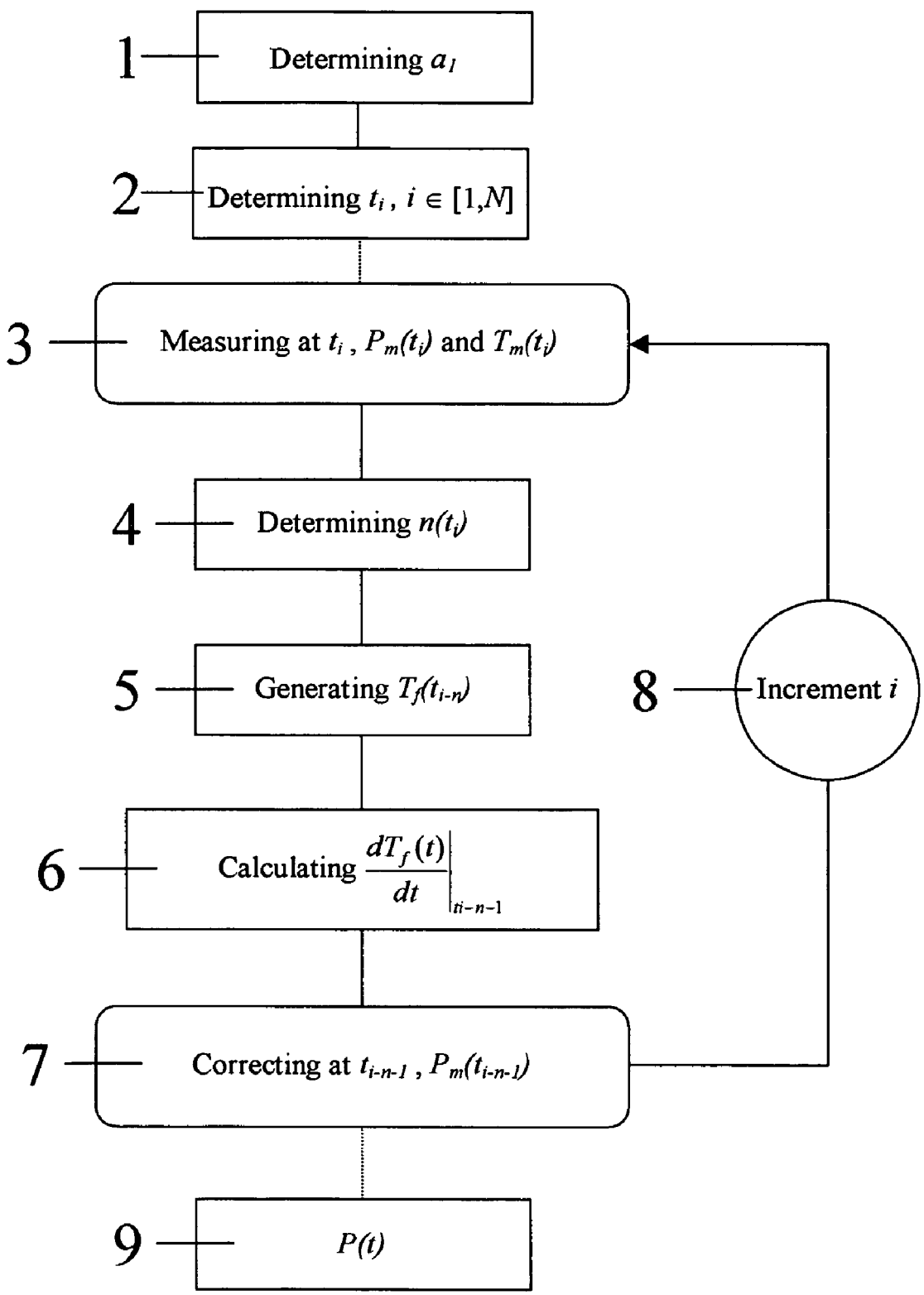
FIG. 3 represents the method of compensation applied to the first order.

The method at the first order according to the invention is described in flow chart of FIG. 3. At step 1, we determine the coefficient $a_1$ with one of the method above. At step 2, we determine a sampling time $t_i$ with i integer between 1 and N. At step 3, we measure at $t_i$, the pressure $P_m(t_i)$ and the temperature $T_m(t_i)$ simultaneously. At step 4, we determine an integer $n(t_i)$ which will define the sliding window $2.n(t_i)$ for the filter. Effectively, to reduce the calculus resources needed to run the method of the invention, it is of prime importance to apply this filter only on a specify window in these temperature measurements, said window being defined to gather the temperature measurements acquired during the same sampling time than the pressure measurements. Therefore, the filter will apply on $2.n(t_i)$ consecutive temperature points, $n(t_i)$ being a variable directly dependent on the gate-time $t_i-t_{i-1}$. More exactly, the term $n(t_i)$ is inversely proportional to the gate-time, meaning that if the time between two consecutive measurements decreases, $n(t_i)$ needs to be raised in order to provide good results. At step 5, we generate a signal $T_f(t_{i-n})$ filtered of the noise during the sliding window $2.n(t_i)$. The low-pass filter applied to the temperature measurements $T_m(t_{i-2n})$ to $T_m(t_i)$ and is based on the least square model. Also, a linear interpolation is used and defines filtered value $T_f(t_{i-n})$. At step 6, we calculate the first derivative in point $t_{i-n-1}$ using the formula:

$$\left.\frac{dT(t)}{dt}\right|_{ti-n-1} = \frac{T_f(t_{i-n}) - T_f(t_{i-n-2})}{t_{i-n} - t_{i-n-2}} \quad (13)$$

Finally, at step 7, we correct value $P_m(t_{i-n-1})$ with the formula:

$$P(t_{i-n-1}) = P_m(t_{i-n-1}) + a_1 \cdot \left.\frac{dT(t)}{dt}\right|_{ti-n-1} \quad (14)$$

We increment i at step 8 and obtain the corresponding corrected values for measured pressure at the end of the loop at step 9.

Figure 4:
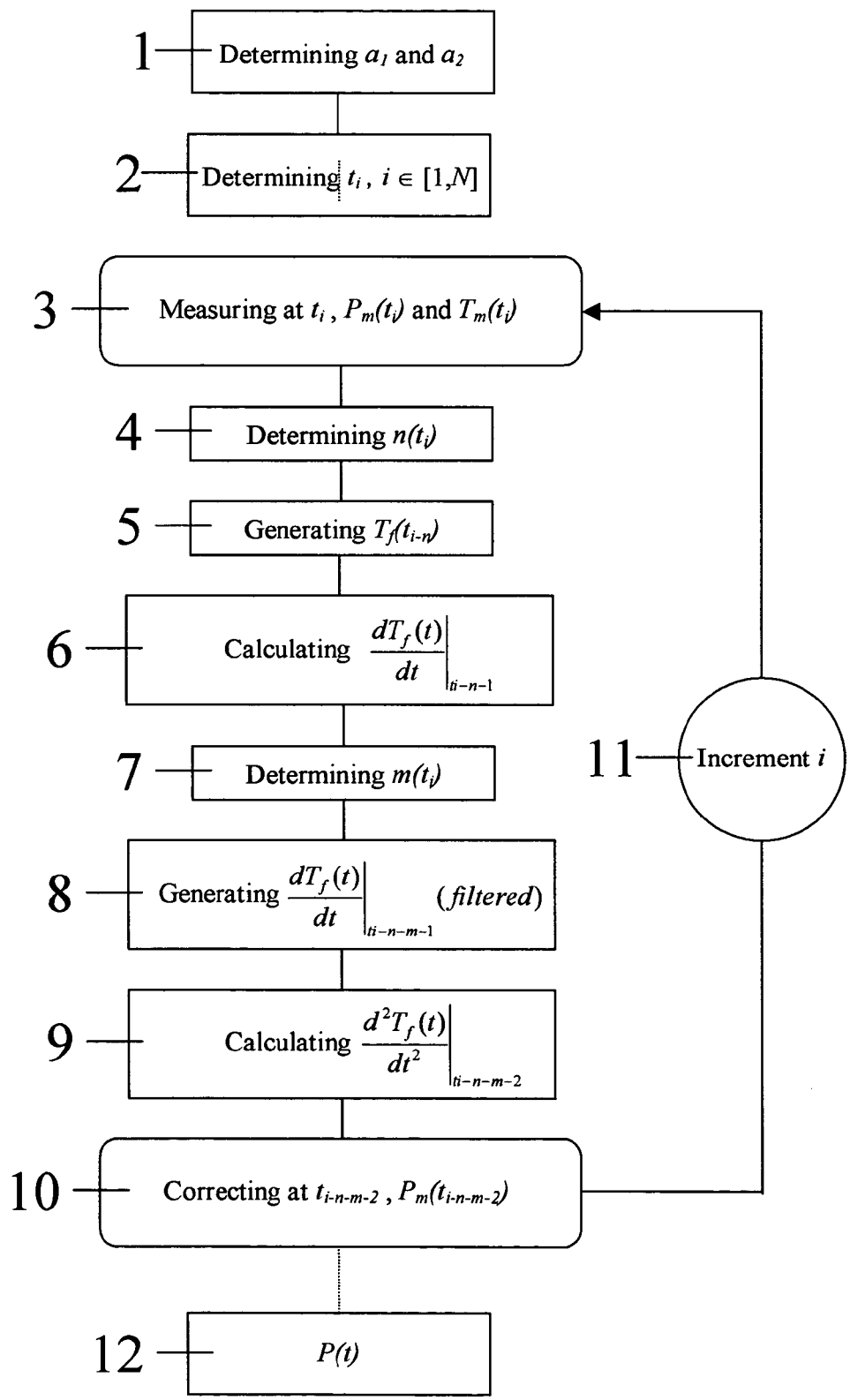
FIG. 4 represents the method of compensation applied to the second order.

The method at the second order according to the invention is described in flow chart of FIG. 4. Steps 1 to 6 are the same as previously described. At step 7, we determine an integer $m(t_i)$ which will define the sliding window $2.m(t_i)$ for the filter, that we apply to the first derivative calculated previously. At step 8, we generate a signal $$\left.\frac{dT(t)}{dt}\right|_{ti-n-m-1} \text{ (filtered)}$$

filtered of the noise during the sliding window $2.m(t_i)$. The low-pass filter applied to the first derivative of temperature $$\left.\frac{dT(t)}{dt}\right|_{ti-n-2m-1} \text{ to } \left.\frac{dT(t)}{dt}\right|_{ti-n-1}$$

and is based on the least square model. Also, a linear interpolation is used and defines filtered value $$\left.\frac{dT(t)}{dt}\right|_{ti-n-m-1} \text{ (filtered)}.$$

At step 9, we calculate the second derivative in point $t_{i-n-m-2}$ using the formula:

$$\left.\frac{d^2T(t)}{dt^2}\right|_{ti-n-m-2} = \frac{\left.\frac{dT(t)}{dt}\right|_{ti-n-m-1} \text{(filtered)} - \left.\frac{dT(t)}{dt}\right|_{ti-n-m-3} \text{(filtered)}}{t_{i-n-m-1} - t_{i-n-m-3}} \quad (15)$$

Finally, at step 10, we correct value $P_m(t_{i-n-m-2})$ with the formula:

$$P(t_{i-n-m-2}) = P_m(t_{i-n-m-2}) + a_1 \cdot \left.\frac{dT(t)}{dt}\right|_{ti-n-m-2} + a_2 \cdot \left.\frac{d^2T(t)}{dt^2}\right|_{ti-n-m-2} \quad (16)$$

We increment i at step 11 and obtain the corresponding corrected values for measured pressure at the end of the loop at step 12.

Figure 5:
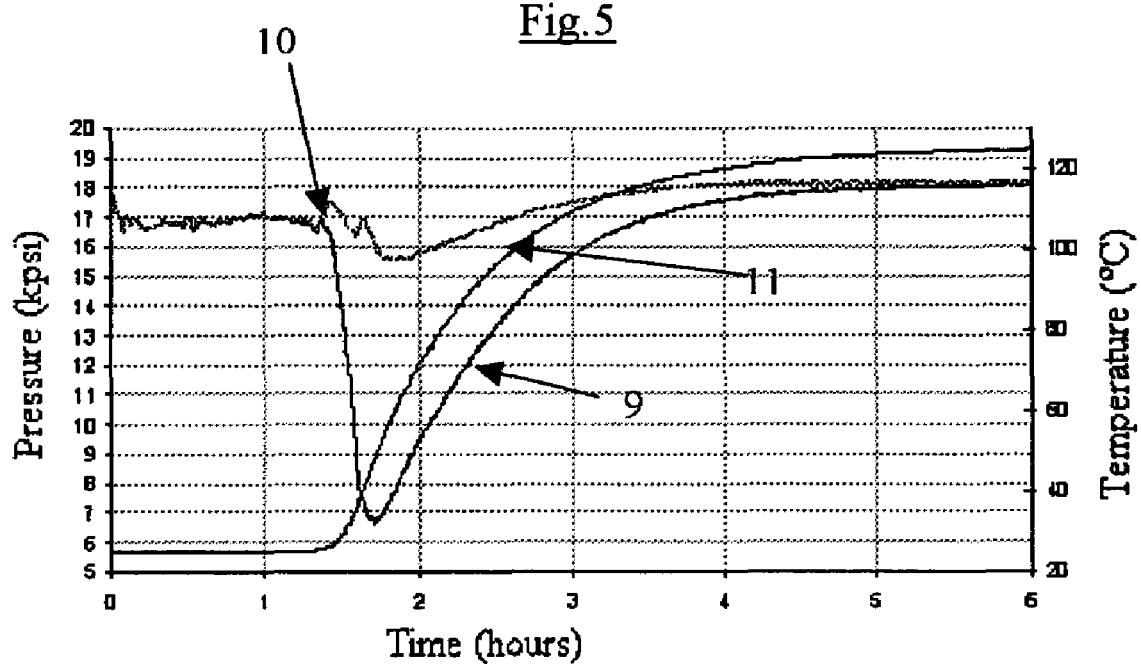
FIGS. 5 to 7 represent the results of the compensation method under various experimental temperature and pressure conditions.
Figure 6:
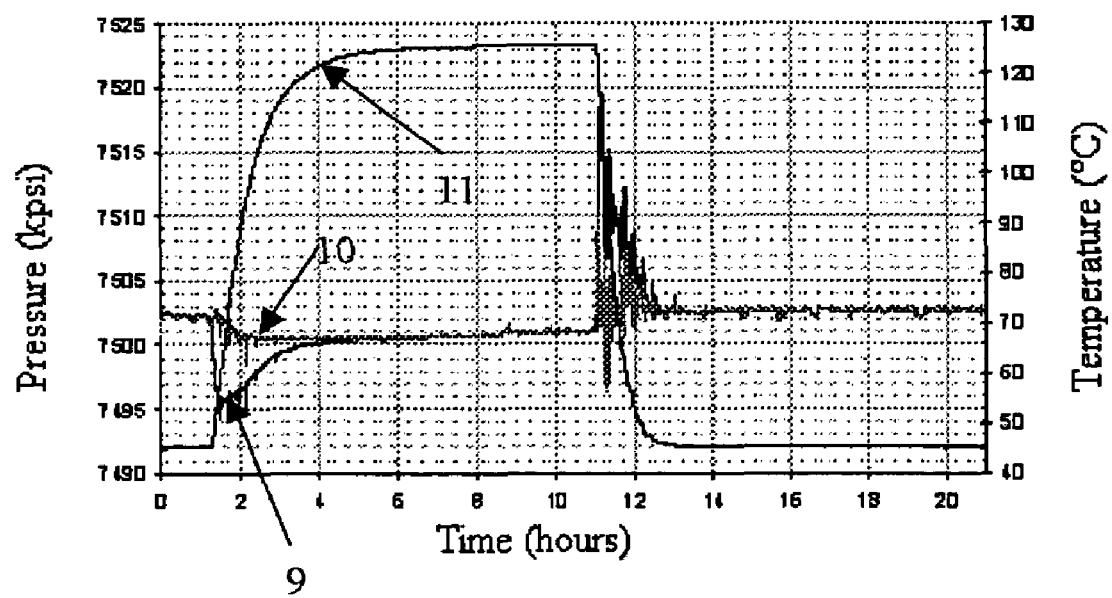
Figure 7:
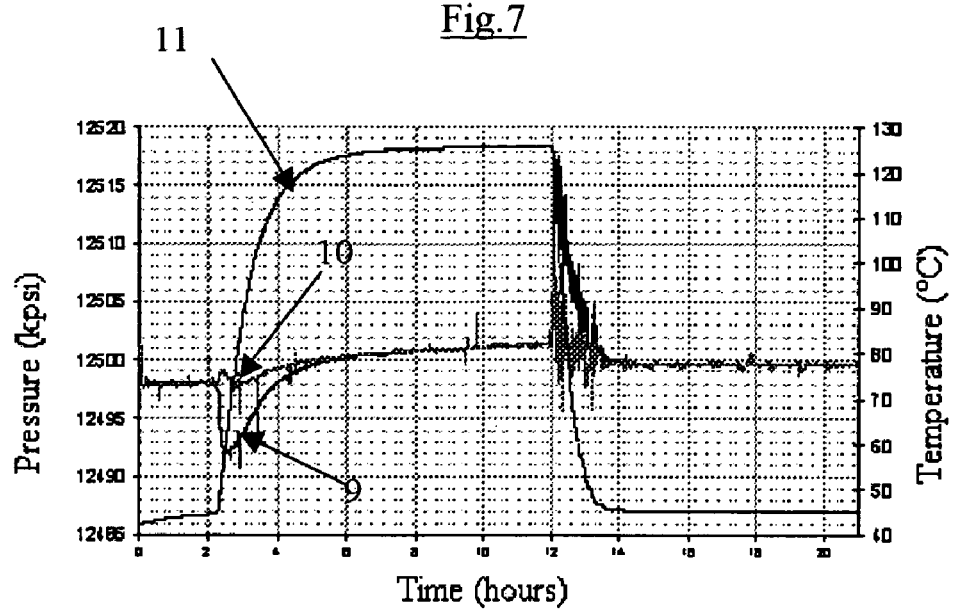

FIGS. 5 to 7 represent the results of the compensation method under various experimental temperature and pressure conditions. Each of these figures reproduces both the experimental and the compensated pressure curves for a pressure gauge a described in FIG. 1. Pressure is represented on the left axe and temperature is represented on the right axe. The curves 9 represent the pressure without compensation, the curves 10 give the compensated pressure after the method for thermal compensation of the invention is applied, and the curves 11 represent the temperature variation. FIG. 3 reproduces the pressure results under atmospheric pressure and 100° C. temperature variation. FIG. 4 reproduces the pressure results under 51.71 Mpa (7.5 kpsi) and 80° C. temperature variation. FIG. 5 reproduces the pressure results under 86.18 MPa (12.5 kpsi) and 80° C. temperature variation.

Figure 8:
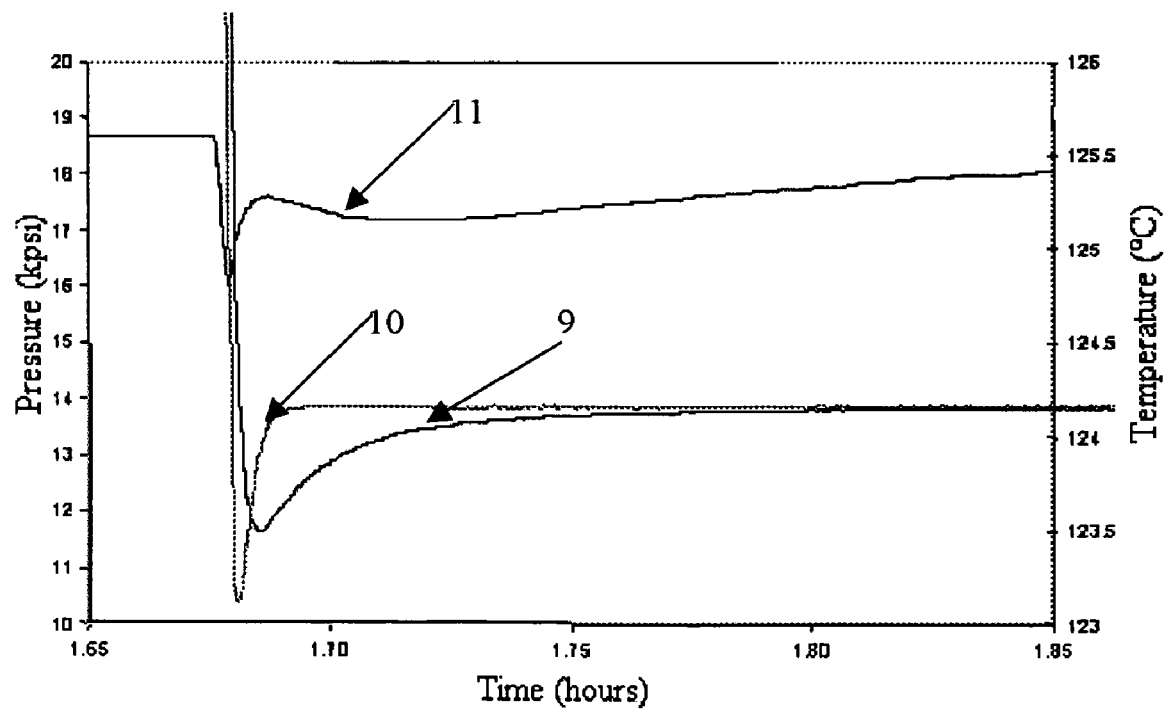
FIG. 8 represents the results of the compensated method in case of a pressure shock.

FIG. 8 represents the corrected signal of a pressure gauge signal in case of a pressure shock from 34.47 Mpa (5 kpsi) down to atmospheric pressure. The temperature is showed by the curve 11, the curve 9 represents the pressure signal without compensation; the curve 10 represents the pressure signal with the compensation method of the invention. This figure clearly shows the ability of the compensated method of the invention to reduce the interval of time between the moment when the pressure shock stopped and the moment when the sensor response becomes stable. As it is visible, the corrected signal introduces a larger undershoot but it gets back to a stabilized value 4 to 5 times faster than the initial without compensation.

The invention claimed is:

1. A method for correction with temperature in the pressure determination of a pressure gauge, comprising:

measuring simultaneously with said gauge said pressure $P_m(t)$ and said temperature $T_m(t)$ during time, generating a signal $T_f(t)$ of said measured temperature $T_m(t)$, said measured temperature being filtered of the noise, correcting said measured pressure $P_m(t)$ with a correction function $F(t)$ containing exclusively a dynamic part, said dynamic part comprising:

a term $a_1$ proportional to first derivative of said $T_f(t)$ signal relative to time;

a second addditional term $a_2$ proportional to second derivative of said $T_f(t)$ signal relative to time;

and wherein the term $a_1$ is determined for a specific population of said pressure gauge, before the step of measuring simultaneously with said gauge said pressure $P_m(t)$ and said temperature $T_m(t)$.

2. The method according to claim 1, wherein the term $a_2$ is determined for a specific population of said pressure gauge, before the step of measuring simultaneously with said gauge said pressure $P_m(t)$ and said temperature $T_m(t)$.

3. The method according to claim 1, for measurement of pressure in real-time comprising the step of:

determining said term $a_1$, measuring overtime pressure $P_m(t_i)$ and temperature $T_m(T_i)$ where $t_i$ is a sampling time with i integer between 1 and N, generating a signal $T_f(t_i)$ of said measured temperature $T_m(t_i)$ through a low-pass filter, calculating the first derivative of said $T_f$ signal with the formula:

$$\left.\frac{dT_f(t)}{dt}\right|_{ti} = \frac{T_f(t_{i+1}) - T_f(t_{i-1})}{t_{i+1} - t_{i-1}},$$

correcting said measured pressure $P_m(t_i)$ with the correction function $$F(t_i) = a_1 \cdot \left.\frac{dT_f(t)}{dt}\right|_{ti}.$$

4. The method according to claim 1, for measurement of pressure in real-time comprising the step of:

determining said term $a_1$ and said term $a_2$, measuring overtime pressure $P_m(t_i)$ and temperature $T_m(t_i)$ where $t_i$ is a sampling time with i integer between 1 and N, generating a signal $T_f(t_i)$ of said measured temperature $T_m(t_i)$ through a first low-pass filter, calculating the first derivative of said $T_f$ signal with the formula:

$$\left.\frac{dT_f(t)}{dt}\right|_{ti} = \frac{T_f(t_{i+1}) - T_f(t_{i-1})}{t_{i+1} - t_{i-1}},$$

generating a signal $$\left.\frac{dT_f(t)}{dt}\right|_{ti} \text{ (filtered)}$$

of said first derivative $$\left.\frac{dT_f(t)}{dt}\right|_{ti}$$

through a second low-pass filter, calculating the second derivative of said $T_f$ signal with the formula:

$$\left.\frac{d^2T_f(t)}{dt^2}\right|_{ti} = \frac{\left.\frac{dT_f(t)}{dt}\right|_{ti+1}\text{(filtered)} - \left.\frac{dT_f(t)}{dt}\right|_{ti-1}\text{(filtered)}}{2 \cdot t_i},$$

correcting said measured pressure $P_m(t_i)$ with the correction function $$F(t_i) = a_1 \cdot \left.\frac{dT_f(t)}{dt}\right|_{ti} + a_2 \cdot \left.\frac{d^2T_f(t)}{dt^2}\right|_{ti}.$$

5. The method according to claim 1, wherein said low-pass filter is a linear interpolation determining a medium value of a range of 2.n values.

6. The method according to claim 3, wherein said medium value is calculated using a least square model.

7. The method according to claim 2, wherein said first low-pass filter is a linear interpolation determining a first medium value of a range of 2.n values and said second low-pass filter is a linear interpolation determining a second medium value of a range of 2.m values.

8. The method according to claim 5, wherein said medium values are calculated using a least square model.

* * * * *